(12) United States Patent
Brensinger

(10) Patent No.: US 10,213,009 B2
(45) Date of Patent: Feb. 26, 2019

(54) METHOD FOR MANUFACTURING AN AIR FILLED STRUCTURE

(71) Applicant: Nemo Equipment, Inc., Dover, NH (US)

(72) Inventor: Camon Brensinger, Stratham, NH (US)

(73) Assignee: NEMO Equipment, Inc., Dover, NH (US)

( * ) Notice: Subject to any disclaimer, the term of this patent is extended or adjusted under 35 U.S.C. 154(b) by 376 days.

(21) Appl. No.: 15/223,318

(22) Filed: Jul. 29, 2016

(65) Prior Publication Data

US 2017/0028615 A1   Feb. 2, 2017

Related U.S. Application Data

(60) Provisional application No. 62/199,481, filed on Jul. 31, 2015.

(51) Int. Cl.
| | |
|---|---|
| *B29D 22/02* | (2006.01) |
| *A45F 3/22* | (2006.01) |
| *A47C 27/08* | (2006.01) |
| *A47C 27/14* | (2006.01) |
| *B29C 65/02* | (2006.01) |
| *A47G 9/08* | (2006.01) |
| *B29K 75/00* | (2006.01) |
| *B29L 31/00* | (2006.01) |

(52) U.S. Cl.
CPC .............. *A45F 3/22* (2013.01); *A47C 27/081* (2013.01); *A47C 27/084* (2013.01); *A47C 27/146* (2013.01); *A47G 9/086* (2013.01); *B29C 65/02* (2013.01); *B29D 22/02* (2013.01); *B29K 2075/00* (2013.01); *B29L 2031/751* (2013.01)

(58) Field of Classification Search
CPC .... A47C 27/081; B29D 22/02; B29C 66/438; B29C 66/439
USPC .................................................. 156/290, 292
See application file for complete search history.

(56) References Cited

U.S. PATENT DOCUMENTS

| 787,137 | A | * | 4/1905 | Webb | |
|---|---|---|---|---|---|
| 3,286,285 | A | * | 11/1966 | Harvey, Jr. | ............ A47C 17/66 297/452.41 |
| 4,092,750 | A | * | 6/1978 | Ellis | ..................... A47C 27/081 5/413 AM |

* cited by examiner

*Primary Examiner* — Scott W Dodds

(57) ABSTRACT

A method for manufacturing an air-filled structure allows for ease of manufacturing utilizing plastic/vinyl/TPU laminated/urethane coated type top and bottom exterior layers as well as an internal baffle, all of which can be heat or chemically bonded together. Most if not all of the bonds or welds required to be made can be created at the same time in a high volume manufacturing step by providing one or more internal layer(s) each with a plurality of openings or cutouts which provide an opening or window through which the internal structure/baffle can be attached directly to the top and bottom layers of the air-filled structure.

7 Claims, 3 Drawing Sheets

METHOD FOR MANUFACTURING AN AIR FILLED STRUCTURE

CROSS-REFERENCE TO RELATED APPLICATIONS

This application claims priority from U.S. Provisional Patent Application No. 62/199,481, titled "OUTDOOR EQUIPMENT 2015", which was filed on Jul. 31, 2015 and is incorporated fully herein by reference.

TECHNICAL FIELD

The present features a method of fixing or attaching insulation or other central layers within a sleeping pad or other air filled fabric structure. The unique construction method provides a sleeping pad that is lightweight and also warm. Cut-outs are provided in at least the interiors layer(s) minimizing weight and allowing the two exterior layers to be welded, stitched or otherwise affixed together in areas of the interior layer cutouts without having to contend with the material of the interior layer(s) utilizing a novel connection element or baffle.

BACKGROUND INFORMATION

Campers, backpackers, bicyclists and other outdoor activity enthusiasts often desire to bring with them a sleeping pad on which their sleeping bag or other sleeping accommodation may be placed in order to minimize discomfort from variations in the ground under the sleeping area and also to help insulate them from any cold or moisture in the ground. In order to achieve this goal, sleeping pads have to be made with enough thickness or bulk to satisfy these requirements. The more bulk or thickness, the heavier the sleeping pad. Often time weight is crucial to those undertaking these outdoor activities since everything they need must be carried on their back.

Air-filled outdoor products such as air mattresses are well known. Unfortunately, the thin urethane coated or laminated material used to manufacture these products often allows heat (or cold) and moisture to seep through the air mattress. Accordingly, it is more desirable to have interior layers such as heat reflective aluminum; insulated layers such as foam, felt, padding or the like on the interior of the air mattress. Manufacturing such air mattresses require that the top and bottom layers be fixed parallel to one another utilizing a connecting element or baffle, otherwise the air mattress will bow or expand like a balloon.

Although some prior art methods are used to keep the top and bottom layers of the air mattress in a fixed, parallel relationship by use of an internal air mattress structure, it has not been possible in the past to use high volume, high speed, low cost manufacturing methods such as heat welding and the like to attach the air mattress internal structure to the top and bottom layers if other internal layers of aluminum, foam or the like are present, since utilizing these attachment techniques require that the internal structure be in direct contact with the top or bottom layer sometimes with an additional TPU layer in place (adding cost and most importantly weight) or that a significant amount of heat and/or power be used to create a heat bond through such internal layers.

Accordingly, what is needed is a warm yet lightweight sleeping pad which achieves these goals as well as a method to manufacture an air filled structure that allows for ease of manufacturing.

SUMMARY OF THE INVENTION

The invention features a method of assembling an air-filled structure. The method comprises the acts of providing a first, generally planar exterior member. The first, generally planar exterior member has a top surface and a bottom surface and a first side and a second side. The first, generally planar exterior member is composed of a heat weldable material.

A second, generally planar exterior member is also provided. The second, generally planar exterior member has a top surface and a bottom surface and a first side and a second side. The second, generally planar exterior member composed of a heat weldable material.

A first, generally planar interior layer is also provided. The first, generally planar interior layer is disposed proximate the bottom surface of the first, generally planar exterior member. The first, generally planar interior layer includes a plurality of openings extending through the first, generally planar interior layer and arranged in a predetermined pattern and position in the first generally planar interior layer.

A second, generally planar interior layer disposed proximate the top surface of the second, generally planar exterior member is provided. The second, generally planar interior layer includes a plurality of openings extending through the second, generally planar interior layer and is arranged in a predetermined pattern and position in the second generally planar interior layer.

A plurality of internal connecting members each including a first external member attachment region and a second external member attachment region are also provided.

The method next proceeds to attaching the first and second generally planar external members to the first and second external member attachment regions respectively on one or more of the plurality of internal connecting members. The first generally planar external member is attached to the first external member attachment region of the plurality of internal connecting members in a plurality of attachment locations utilizing a heat attachment method. Each of the plurality of attachment locations is provided through one of the plurality of openings in the first generally planar interior layer. The second generally planar external member is also attached to the second external member attachment region of the plurality of internal connecting members in a plurality of attachment locations utilizing a heat attachment method. Each of the plurality of attachment locations is provided through one of the plurality of openings in the second generally planar interior layer.

In a further embodiment, the first and second generally planar members and the one or more internal structure members are made of a heat weldable thermoplastic polyurethane (TPU), while the first and second generally planar internal layers are not heat weldable. In a further embodiment, the plurality of internal connecting members are also made of a heat weldable thermoplastic polyurethane (TPU).

Each of the plurality of internal connecting members may include a horizontally oriented top member forming the first external member attachment region and a horizontally oriented bottom member forming the second external member attachment region. Each of the plurality of internal connecting members may further include a plurality of vertically oriented connecting members disposed between the a horizontally oriented top member and the horizontally oriented bottom member and wherein the plurality of internal connecting members further include a plurality of open regions disposed between the plurality of vertically oriented connecting members.

In a further embodiment, the least one of the first and second generally planar interior layers are an insulative layer such as a layer selected from the group of insulative material consisting of foam, felt and cloth.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

The present invention features a method for manufacturing an air-filled structure which allows for ease of manufacturing utilizing plastic/vinyl/TPU laminated/urethane coated type exterior layers which can be heat or chemically bonded together.

Figure 1A:
FIGS. 1A-1C illustrate the several layers used to construct the multilayer pad according to the present invention.
Figure 1B:
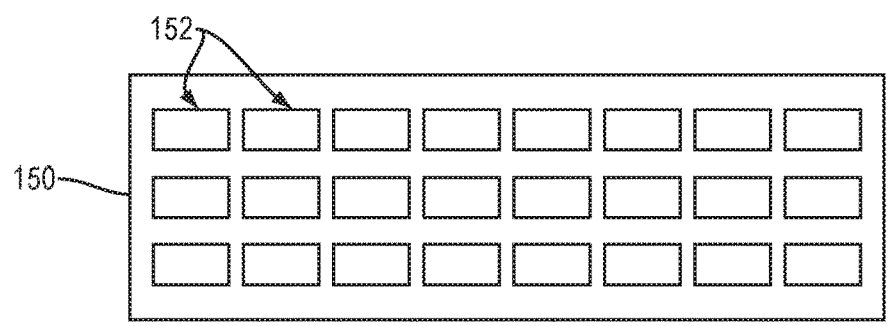
Figure 1C:
Figure 2:
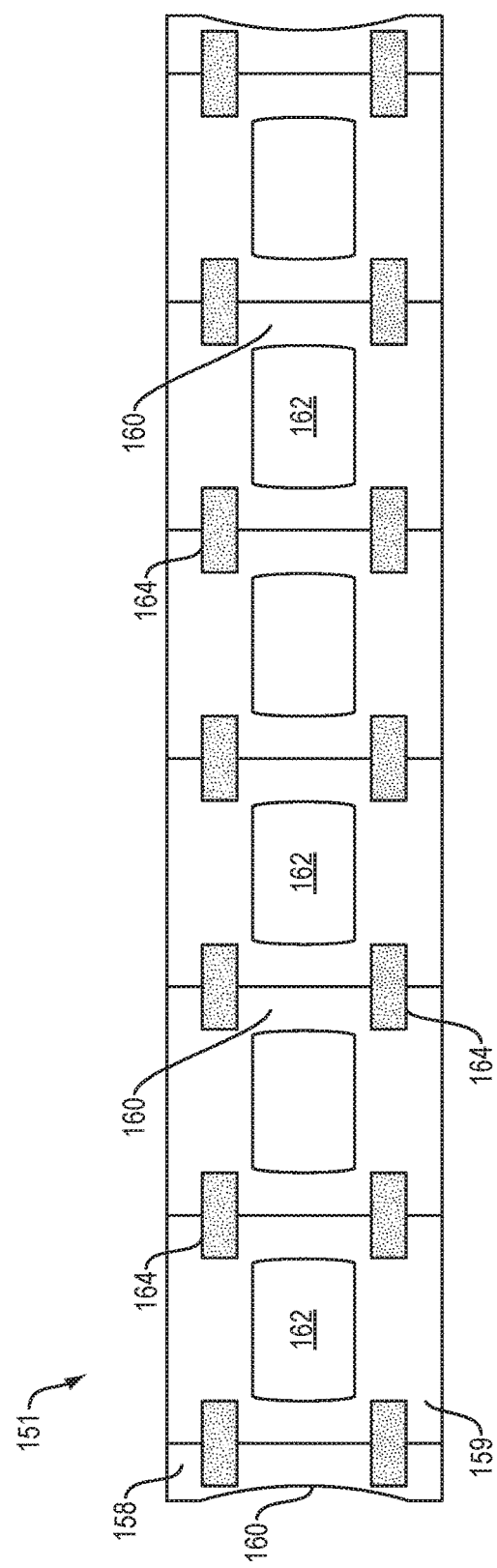
FIG. 2 is a schematic representation of the internal structure/baffle utilized in manufacturing the multilayer pad according to the invention.
Figure 3:
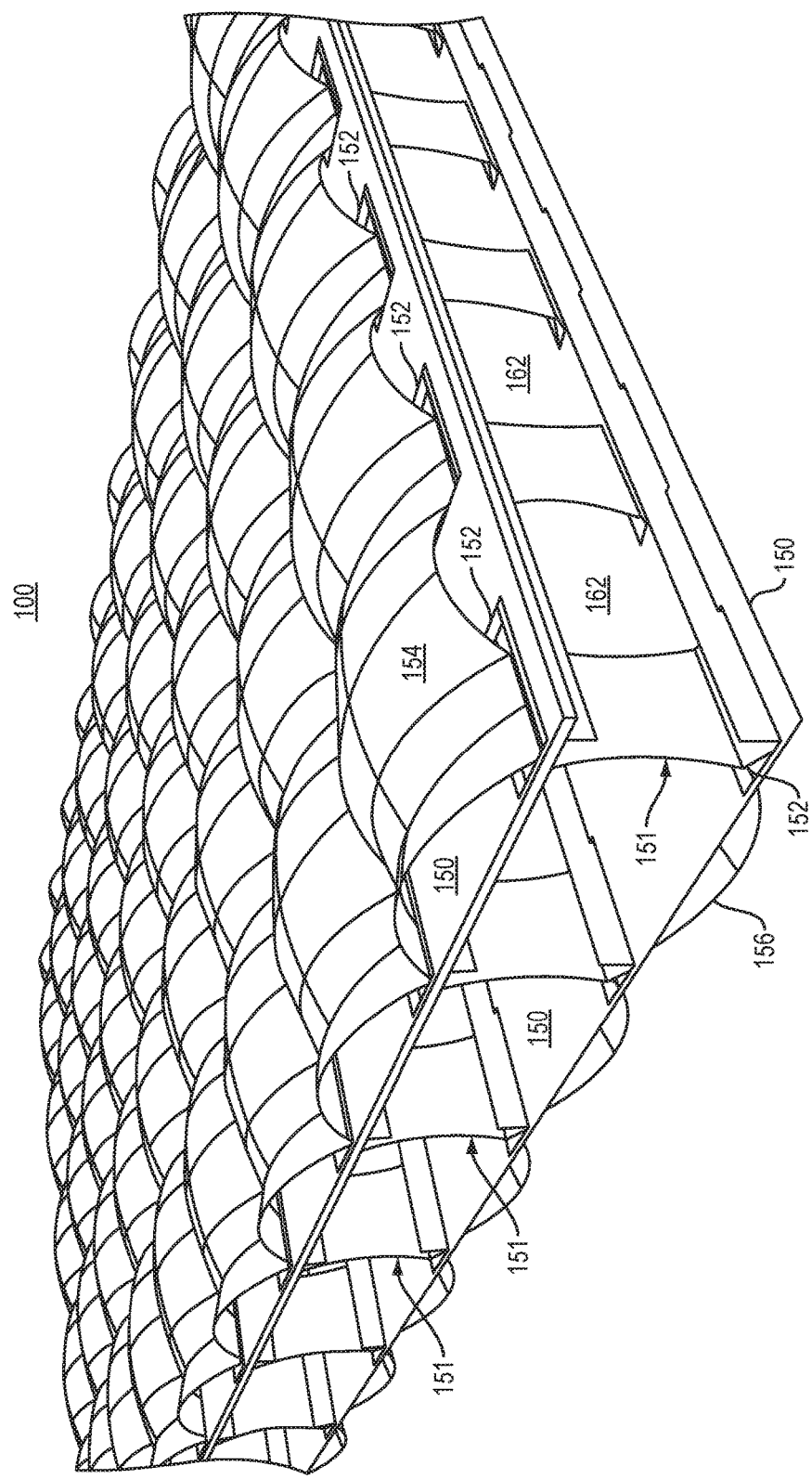
FIG. 3 is a perspective view of an air mattress incorporating the internal layers having cutouts through which are fastened or secured the internal structure/baffle shown in FIG. 2.

The present invention overcomes the obstacles in the prior art allowing most if not all of the bonds or welds required to be made to be created at the same time in a high volume manufacturing step by providing one or more internal layer(s) 150, FIG. 1B with a plurality of openings or cutouts 152 which provide an opening or window through which the air-filled internal structure/baffle 151 FIG. 2 can be attached directly to the top and bottom layers 154, 156 of air-structure 100, FIG. 3 respectively, as will be detailed below.

The internal layer(s) 150 is/are not welded or otherwise attached in place but rather, are "pinned" or held in place through openings 152 by virtue of the attachment of the top and bottom layers to the intermediate baffle layer as will be detailed below.

The invention contemplates that one or more internal layers 150 will be provided such as heat and/or cold reflective layers, one or more insulation layers such as a thin foam, felt, thick cloth or other similar layer that would provide some insulation value between the user and the ground, or the like. The top and bottom layers 154, 156 are typically made of TPU or urethane material which is heat weldable or other similar manufacturing process to quickly and economically bond TPU or urathane layers together. Thermoplastic polyurethane (TPU) is an elastomer that is fully thermoplastic. Like all thermoplastic elastomers, TPU is elastic and melt-processable and thus used extensively in high volume manufacturing processes.

The internal structure/baffle 151 is made of the same type of TPU material. By providing all of the openings or windows 152 in the interior layer(s) 150, the finished weight of the air mattress is significantly reduced, by approximately one third, and high speed, high volume manufacturing techniques may be utilized by allowing the TPU top and bottom layers 154, 156 to be heat welded through the openings 152 in the interior layer (s) to the TPU internal/baffle layer (s) 151 without concern for whether or not the interior layers 150 are heat weldable or not (typically not).

The internal structure/baffle 151 includes first and second horizontal members 158, 159, connected by a plurality of vertical members 160 leaving a plurality of open spaces 162 between each of the vertical members 160.

The attachment or welding of the internal structure 151 to the top and bottom layers 154, 156 is accomplished in the region 164 where the vertical members 160 meet the horizontal members 158, 159 as shown generally by the areas indicated by dashed lines 164 and in or through the open spaces 152 in the interior layer(s) 150. There is one welding or attachment point 164 generally provided at the intersection of each vertical 160 and horizontal 158, 159 member, top and bottom, as shown in FIG. 2.

Utilizing this technique, one or more internal layers 150 having a plurality of openings or windows may be provided proximate the top and/or bottom sheets of material 154, 156 and subsequently, the top and bottom layers 154, 156 can be attached together and kept in fixed parallel relationship utilizing the internal structure device 151 of the present invention while the internal layer(s) 150 are "pinned" or held in place by the welding spots 164 that occur in each or most openings or windows 150 in the internal layers 150 and completely without worrying about what type of material the internal layers 150 are made of a whether or not they are heat weldable. By providing all of the openings or windows 162 in the interior baffle layer(s) 151, the finished weight of the air mattress is again significantly reduced, by approximately one third or more and the openings allow air to move freely through the air-filled structure. In this regards, an air filling and dumping valve (not shown but well known in the art) is provided.

Modifications and substitutions by one of ordinary skill in the art are considered to be within the scope of the present invention, which is not to be limited except by the allowed claims and their legal equivalents.

What is claimed is:

1. A method of assembling an air-filled structure, said method comprising the acts of:

providing a first, generally planar exterior member, said first, generally planar exterior member having a top surface and a bottom surface and a first side and a second side, said first, generally planar exterior member composed of a heat weldable material;

providing a second, generally planar exterior member, said second, generally planar exterior member having a top surface and a bottom surface and a first side and a second side, said second, generally planar exterior member composed of a heat weldable material;

providing a first, generally planar interior layer, said first, generally planar interior layer disposed proximate said bottom surface of said first, generally planar exterior member, said first, generally planar interior layer including a plurality of openings extending through said first, generally planar interior layer and arranged in a predetermined pattern and position in said first generally planar interior layer;

providing a second, generally planar interior layer, said second, generally planar interior layer disposed proximate said top surface of said second, generally planar exterior member, said second, generally planar interior layer including a plurality of openings extending through said second, generally planar interior layer and arranged in a predetermined pattern and position in said second generally planar interior layer;

providing a plurality of internal connecting members, each of said plurality of internal connecting members including a first external member attachment region and a second external member attachment region; and attaching said first and second generally planar exterior members to said first and second external member attachment regions respectively on said plurality of internal connecting members, wherein said first generally planar exterior member is attached to said first external member attachment region of said plurality of internal connecting members in a plurality of attachment locations utilizing a heat attachment method, each of said plurality of attachment locations provided through one of said plurality of openings in said first generally planar interior layer, and wherein said second generally planar exterior member is attached to said second external member attachment region of said plurality of internal connecting members in a plurality of attachment locations utilizing a heat attachment method, each of said plurality of attachment locations provided through one of said plurality of openings in said second generally planar interior layer, wherein the first and second generally planar interior layers are not welded or otherwise attached but are pinned in place by virtue of the attachment of the first and second generally planar exterior members to said plurality of internal connecting members.

2. The method of claim 1, wherein said first and second generally planar exterior members and said internal connecting members are made of a heat weldable thermoplastic polyurethane (TPU), and wherein said first and second generally planar internal layers are not heat weldable.

3. The method of claim 1, wherein said plurality of internal connecting members are made of a heat weldable thermoplastic polyurethane (TPU).

4. The method of claim 1, wherein each of said plurality of internal connecting members includes a horizontally oriented top member forming said first external member attachment region and a horizontally oriented bottom member forming said second external member attachment region, each of said plurality of internal connecting members further including a plurality of vertically oriented connecting members disposed between said a horizontally oriented top member and said horizontally oriented bottom member, wherein said plurality of internal connecting members further include a plurality of open regions disposed between said plurality of vertically oriented connecting members.

5. The method of claim 1, wherein at least one of said first and second generally planar interior layers are an insulative layer.

6. The method of claim 5, wherein the insulative layer is selected from the group of insulative material consisting of foam, felt, and cloth.

7. A method of assembling an air-filled structure, said method comprising the acts of:

providing a first, generally planar exterior member, said first, generally planar exterior member having a top surface and a bottom surface and a first side and a second side, wherein said first, generally planar exterior member is made of a heat weldable thermoplastic polyurethane (TPU);

providing a second, generally planar exterior member, said second, generally planar exterior member having a top surface and a bottom surface and a first side and a second side, wherein said second, generally planar exterior member is made of a heat weldable thermoplastic polyurethane (TPU);

providing a first, generally planar interior layer, said first, generally planar interior layer disposed proximate said bottom surface of said first, generally planar exterior member, said first, generally planar interior layer including a plurality of openings extending through said first, generally planar interior layer and arranged in a predetermined pattern and position in said first generally planar interior layer;

providing a second, generally planar interior layer, said second, generally planar interior layer disposed proximate said top surface of said second, generally planar exterior member, said second, generally planar interior layer including a plurality of openings extending through said second, generally planar interior layer and arranged in a predetermined pattern and position in said second generally planar interior layer;

providing a plurality of internal connecting members, each of said plurality of internal connecting members including a first external member attachment region and a second external member attachment region, wherein said plurality of internal connecting members are made of a heat weldable thermoplastic polyurethane (TPU), wherein each of said plurality of internal connecting members includes a horizontally oriented top member forming said first external member attachment region and a horizontally oriented bottom member forming said second external member attachment region, each of said plurality of internal connecting members further including a plurality of vertically oriented connecting members disposed between said a horizontally oriented top member and said horizontally oriented bottom member, wherein said plurality of internal connecting members further include a plurality of open regions disposed between said plurality of vertically oriented connecting members; and attaching said first and second generally planar exterior members to said first and second external member attachment regions respectively on said plurality of internal connecting members, wherein said first generally planar exterior member is attached to said first external member attachment region of said plurality of internal connecting members in a plurality of attachment locations utilizing a heat attachment method, each of said plurality of attachment locations provided through one of said plurality of openings in said first generally planar interior layer, and wherein said second generally planar exterior member is attached to said second external member attachment region of said plurality of internal connecting members in a plurality of attachment locations utilizing a heat attachment method, each of said plurality of attachment locations provided through one of said plurality of openings in said second generally planar interior layer, wherein the first and second generally planar interior layers are not welded or otherwise attached but are pinned in place by virtue of the attachment of the first and second generally planar exterior members to said plurality of internal connecting members.

* * * * *